United States Patent
Schroder (10) Patent No.: US 11,643,863 B2
(45) Date of Patent: May 9, 2023

(54) INTEGRATED SASH ASSEMBLY

(71) Applicant: Pella Corporation, Pella, IA (US)

(72) Inventor: Paul D. Schroder, Pella, IA (US)

(*) Notice: Subject to any disclaimer, the term of this patent is extended or adjusted under 35 U.S.C. 154(b) by 0 days.

(21) Appl. No.: 17/081,463

(22) Filed: Oct. 27, 2020

(65) Prior Publication Data
US 2021/0123291 A1  Apr. 29, 2021

Related U.S. Application Data

(60) Provisional application No. 62/927,021, filed on Oct. 28, 2019.

(51) Int. Cl.
*E06B 3/24* (2006.01)
*E06B 3/263* (2006.01)

(52) U.S. Cl.
CPC ............. *E06B 3/24* (2013.01); *E06B 3/263* (2013.01); *E06B 2003/26389* (2013.01)

(58) Field of Classification Search
CPC ... E06B 3/22; E06B 3/24; E06B 3/263; E06B 3/2605; E06B 2003/26389
USPC ......................................................... 52/204.6
See application file for complete search history.

(56) References Cited

U.S. PATENT DOCUMENTS

| | | | |
|---|---|---|---|
| RE21,126 E * | 6/1939 | Axe | E06B 3/2605 |
| | | | 52/172 |
| 2,329,567 A * | 9/1943 | Verhagen | E06B 3/26301 |
| | | | 52/204.595 |
| 2,502,575 A * | 4/1950 | Lemyre | E06B 3/64 |
| | | | 52/204.595 |

(Continued)

FOREIGN PATENT DOCUMENTS

| | | | | |
|---|---|---|---|---|
| CH | 355925 A | * | 7/1961 | .......... E06B 3/2605 |
| CH | 372454 A | * | 10/1963 | .............. E06B 3/24 |

(Continued)

*Primary Examiner* — Christine T Cajilig
(74) *Attorney, Agent, or Firm* — Faegre Drinker Biddle & Reath; Jonathan Webb; Victor Jonas (57) ABSTRACT

An integrated sash unit including a first sash portion. The first sash portion a first body portion and a first receiving wall extending inwardly from the first body portion. The first receiving wall has a first inner wall surface and a first peripheral wall surface opposing the first inner wall surface. The first body portion defines a first receiving surface and a first coupling surface and a first body peripheral surface opposite the first receiving surface and the first coupling surface. The integrated sash unit also includes a second sash portion forming a second body portion and a second receiving wall extending inwardly from the second body portion. The second receiving wall has a second inner wall surface and a second peripheral wall surface opposing the second inner wall surface. The second body portion defines a second receiving surface and a second coupling surface and a second body peripheral surface. The first coupling surface of the first sash portion is coupled to the second coupling surface of the second sash portion. The integrated sash unit also includes a first glazing panel supported by and coupled to the first inner wall surface of the first sash portion without being coupled to the second sash portion and a second glazing panel supported by and coupled to the second inner wall surface of the second sash portion without being coupled to the first sash portion.

25 Claims, 4 Drawing Sheets

(56) References Cited

U.S. PATENT DOCUMENTS

| | | | | |
|---|---|---|---|---|
| 2,506,631 | A | * | 5/1950 | Daniels ................ E06B 3/2605 49/388 |
| 2,670,508 | A | * | 3/1954 | Sylvan ................ E06B 3/2605 52/786.1 |
| 2,993,242 | A | * | 7/1961 | Leisibach ................ E06B 3/24 52/204.593 |
| 4,850,168 | A | | 7/1989 | Thorn |
| 4,984,403 | A | * | 1/1991 | Zarwell .................... E04C 1/42 52/476 |
| 6,047,514 | A | | 4/2000 | Verch |
| 6,401,428 | B1 | * | 6/2002 | Glover .................... E06B 3/24 52/786.1 |
| 6,743,489 | B2 | * | 6/2004 | Compton ............. E06B 3/2605 428/34 |
| 6,868,648 | B2 | | 3/2005 | Glover et al. |
| 7,097,724 | B2 | | 8/2006 | Hornung et al. |
| 7,588,653 | B2 | | 9/2009 | Crandell et al. |
| 7,845,142 | B2 | * | 12/2010 | Theios ................ E06B 3/6612 52/786.1 |
| 2002/0189196 | A1 | | 12/2002 | Hornung et al. |
| 2003/0072899 | A1 | * | 4/2003 | Compton ............. E06B 3/2605 428/34 |
| 2003/0126812 | A1 | | 7/2003 | Folsom et al. |
| 2015/0096257 | A1 | | 4/2015 | Sinnathamby et al. |

FOREIGN PATENT DOCUMENTS

| | | | | |
|---|---|---|---|---|
| FR | 59122 E | * | 4/1954 | ............... E06B 3/24 |
| FR | 3061734 A1 | * | 7/2018 | |
| WO | 2013/090757 A1 | | 6/2013 | |

\* cited by examiner

INTEGRATED SASH ASSEMBLY

CROSS REFERENCE TO RELATED APPLICATIONS

The present application claims the benefit of U.S. Provisional Patent Application No. 62/927,021 filed Oct. 28, 2019, which is incorporated herein by reference in its entirety.

FIELD

The present disclosure relates generally to designs for fenestration units and, more specifically, to designs for integrated sash units. The disclosure also relates to methods of assembling fenestration units and integrated sash units.

BACKGROUND

Basic window assemblies traditionally include a frame (the framework that surrounds and supports the entire window system, comprised of the head, jamb and sill) and one or more sashes (a fixed or movable part of a window made up of the vertical and horizontal frame that holds the glazing, or glass panels). Often times, for enhanced thermal performance, the glazing is in the form of an insulated glass unit, or IG unit for short. An IG unit includes two or more sheets, or panes of glazing separated by one or more spacers with sealed space(s) between the two or more sheets of glazing. Air, inert gases, or even vacuum may be present in the sealed space(s) to enhance thermal performance. The IG unit is assembled to the sash to provide a fixed or venting (e.g., double hung or casement) arrangement. Assembly of such fenestration units can be time consuming, expensive, and inefficient. Various technological improvements addressing such shortcomings remain unrealized.

SUMMARY

Various aspects of the present disclosure are directed toward apparatuses, systems, and methods that relate to improved insulating glass/sash assemblies for fenestration units, including windows and doors.

Some examples relate to an integrated sash unit comprising a plurality of vapor barrier sealant systems; a first sash portion; a second sash portion coupled to the first sash portion by one or more of the vapor barrier sealant systems; and a plurality of glazing panels coupled to the first and second sash portions by one or more of the vapor barrier sealant systems.

Some examples relate to an integrated sash unit comprising a first sash portion forming a first body portion and a first receiving wall extending inwardly from the first body portion, the first receiving wall having a first inner wall surface and a first peripheral wall surface opposing the first inner wall surface, and the first body portion defining a first receiving surface and a first coupling surface and a first body peripheral surface opposite the first receiving surface and the first coupling surface; a second sash portion forming a second body portion and a second receiving wall extending inwardly from the second body portion, the second receiving wall having a second inner wall surface and a second peripheral wall surface opposite the second inner wall surface, and the second body portion defining a second receiving surface and a second coupling surface and a second body peripheral surface, the first coupling surface of the first sash portion being coupled to the second coupling surface of the second sash portion; and a plurality of glazing panels including, a first glazing panel supported by and coupled to the first inner wall surface of the first sash portion without being coupled to the second sash portion; and a second glazing panel supported by and coupled to the second inner wall surface of the second sash portion without being coupled to the first sash portion.

Still other examples relate to a method of assembling an integrated sash unit, the method comprising attaching a first glazing panel to a first inner wall surface of a first sash portion; attaching a second glazing panel to a second inner wall surface of a second sash portion; positioning the second sash portion adjacent the first sash portion such that the first glazing panel and the second glazing panel are spaced from one another; and adhering a first coupling surface of the first sash portion to a second coupling surface of the second sash portion.

The foregoing Examples are just that and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

DETAILED DESCRIPTION

Definitions and Terminology

As the terms are used herein with respect to ranges of measurements "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

This disclosure is not meant to be read in a restrictive manner. For example, the terminology used in the application should be read broadly in the context of the meaning those in the field would attribute such terminology.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

Certain terminology is used herein for convenience only. For example, words such as "top", "bottom", "upper," "lower," "left," "right," "horizontal," "vertical," "upward," and "downward" merely describe the configuration shown in the figures or the orientation of a part in the installed position. Indeed, the referenced components may be oriented in any direction. Similarly, throughout this disclosure, where a process or method is shown or described, the method may be performed in any order or simultaneously, unless it is clear from the context that the method depends on certain actions being performed first.

Description of Various Embodiments

Various embodiments disclosed herein relate generally to designs for fenestration units and, more specifically, to integrated sash units that are versatile, customizable, and easy to assemble and install. Various aspects relate to methods for assembling the integrated sash units and/or associated fenestration units. For reference, although the term "sash" is utilized throughout this disclosure, it should be understood that the term is meant to be inclusive of both doors and windows, and the term "sash" is meant to be applicable to components such as both fixed and movable window and door sashes and panels, for example.

Although a variety of additional or alternative advantages will be apparent, some embodiments address one or more of a fiberglass or other composite shell sash system that approximates the coefficient of thermal expansion (CTE) of glass, has relative high service temperature and thus color options, incorporates effective moisture barrier(s) into the assembly, is gas-filled (e.g., with air to avoid potential Argon loss), and/or may incorporate one or more desiccant systems to permit pressure equalization and moisture reduction within the assembly. Various assemblies permit the use of any combination of lights, panels, or glazing, has a clamshell design that permits mixing and matching of interior vs. exterior colors and treatments, and/or is amenable to in-line foam pultrusion assembly to achieve efficient manufacture at desired outer wall or skin tolerances.

Figure 1:
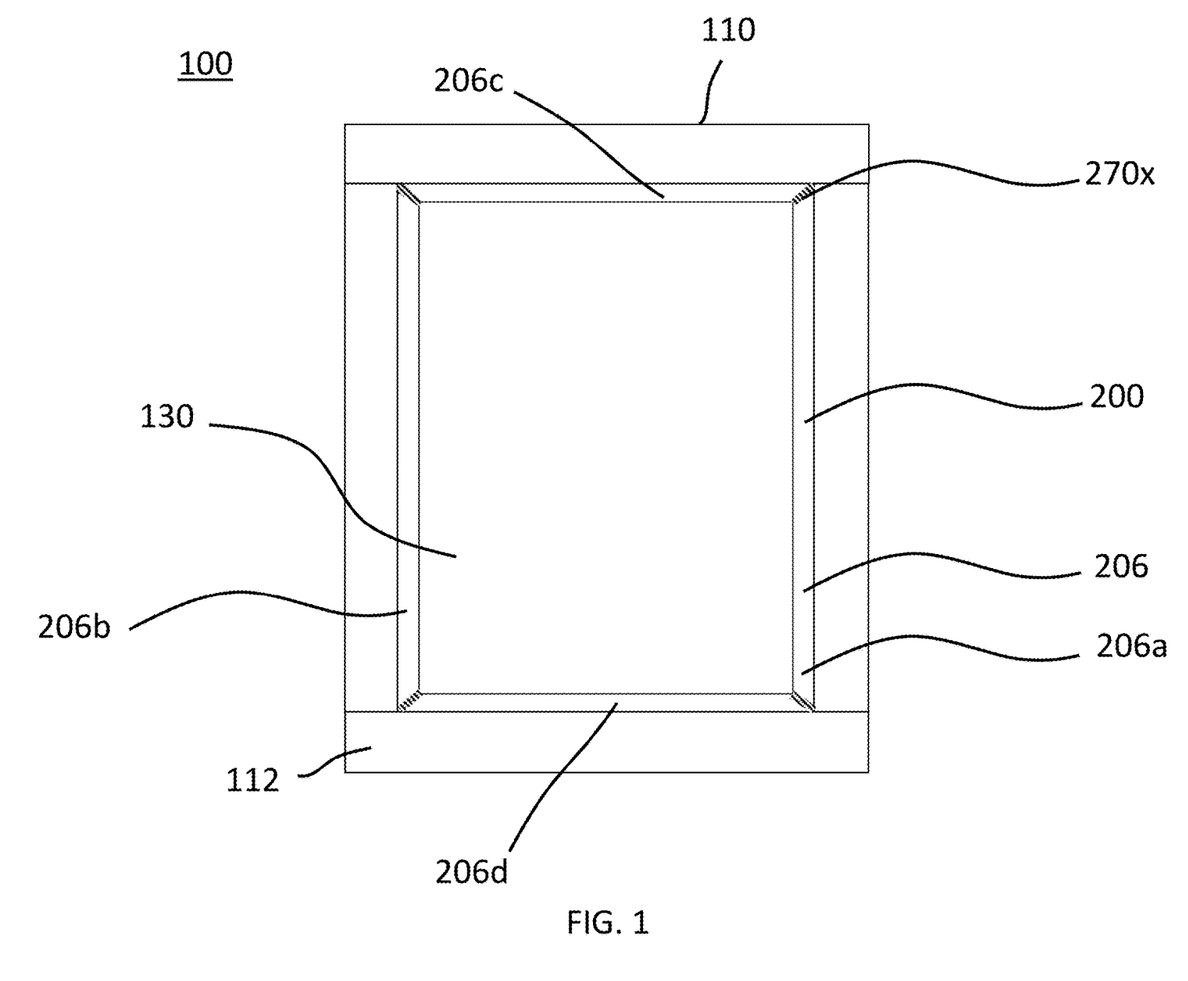
FIG. 1 is a front view of a fenestration unit assembly, in accordance with an embodiment.
Figure 2:
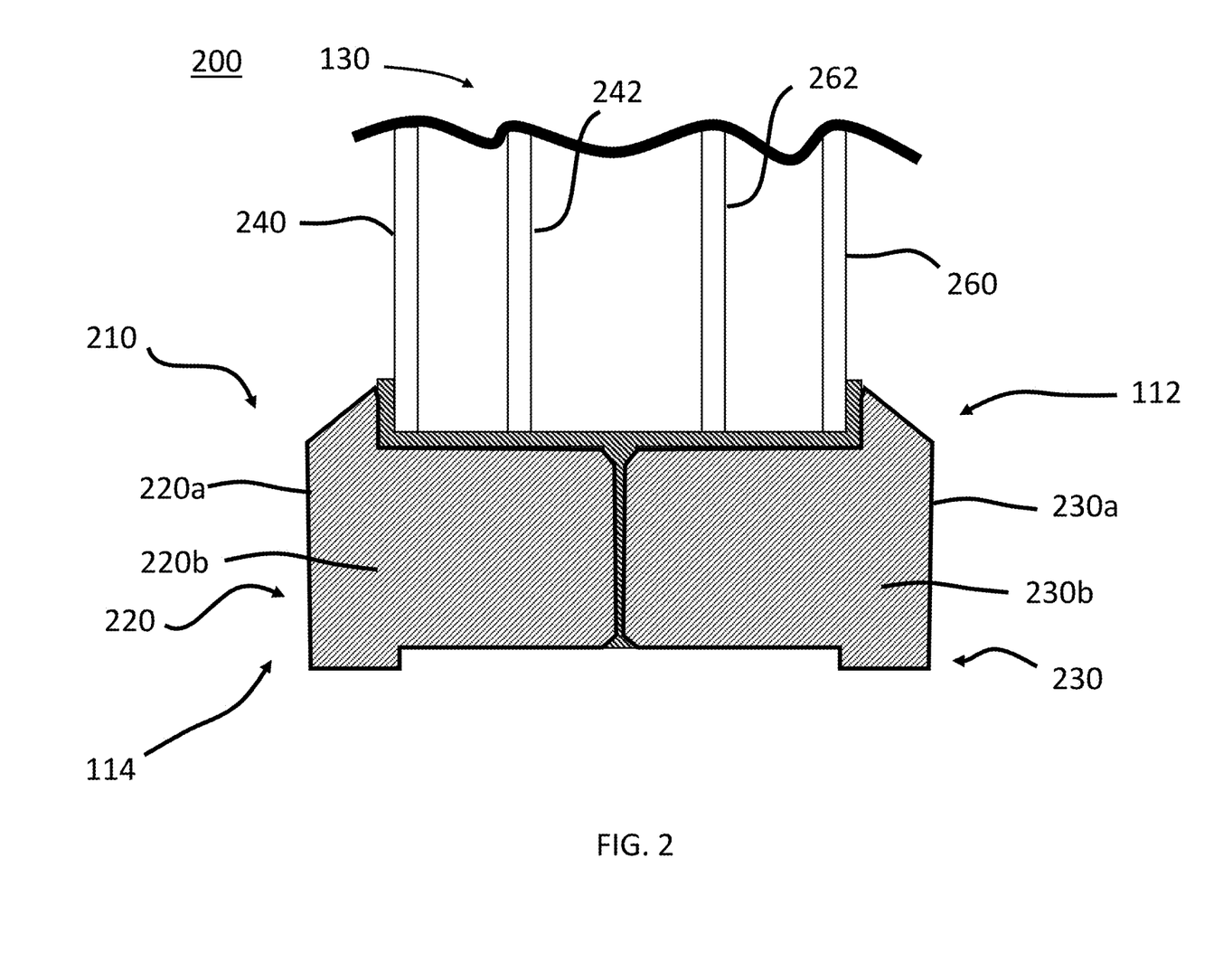
FIG. 2 is a cross-sectional view of an integrated sash unit, in accordance with an embodiment.

FIG. 1 is a front view of a fenestration unit 100, in accordance with an embodiment. The fenestration unit 100 generally includes a frame 110 including an interior side 112 and an exterior side (FIG. 2). The interior side 112 can be arranged, for example, toward an interior of a building and the exterior side 114 can be arranged toward an exterior of a building. The fenestration unit 100 also includes an integrated sash unit 200 including a frame 110 sealed to a plurality of glazing panels 130 (e.g., a glass panel, for example). The integrated sash unit 200 generally includes a plurality of sash members 206 including a first sash member 206a or first stile 206a, a second sash member 206b or second stile 206b, a third sash member 206c or upper rail 206c, and a fourth sash member 206d or lower rail 206d. Although the fenestration unit 100 shown in FIG. 1 is a fixed window or casement window, the same principals can be applied to other types of fenestration units and their associated sashes, including double hung windows, for example.

FIG. 2 is a transverse cross-sectional view of the integrated sash unit 200, in accordance with an embodiment. The integrated sash unit 200 has an interior side 112 and an exterior side 114. The integrated sash unit includes a body 210 defined by the sash members 206 and is formed by a first sash portion 220 arranged adjacent to, and coupled to a second sash portion 230. In some instances, the first sash portion 220 may be arranged toward an interior of the building and the second sash portion 230 may be arranged toward an exterior of the building.

The first sash portion 220 includes a first shell 220a and a first inner core 220b. In some examples, the first shell 220a forms a single, interior space or cavity. The first inner core 220b may be a foam material filling the entire interior space or, in some instances, substantially all of the interior space (e.g., greater than 90%, 95% or more). The first inner core 220b is arranged within the first shell 220a. In some instances, the first shell 220a may be a thin, fiberglass layer. For example, the first sash portion 220 may be a pultruded portion.

Like the first sash portion 220, the second sash portion 230 includes a second shell 230a and a second inner core 230b. In some examples, the second shell 230a forms a single, interior space or cavity, and the second inner core 230b may be a foam material filling the entire interior space or, in some instances, substantially all of the interior space (e.g., greater than 90%, 95% or more). The first and second sash portions 220, 230 may be either symmetrical or asymmetrical depending on a variety of factors, including the number of glazing panels 130 desired in the first and second sash portions 220, 230 and the respective appearance of the interior versus exterior sides. For example, as shown, the first and second sash portions 220, 230 are substantially identical in size and shape yet opposite in orientation to the first sash portion 220. In other instances, however, the first and second sash portions 220, 230 vary in size, shape, materials, and/or appearance.

As shown in FIG. 2, the integrated sash unit 200 can include a first glazing panel 240 and a third glazing panel 242 arranged a distance from the first glazing panel 240 and with the first sash portion 220 The integrated sash unit 200 as shown also includes a third glazing panel 242 and a fourth glazing panel 262. The third glazing panel 242 is arranged a distance from the first glazing panel 240 and the fourth glazing panel 262 is arranged a distance from the second glazing panel 260. The space between the glazing panels 130 may be gas-filled (e.g., air, argon, krypton, mixtures thereof or other gases), for example, to provide for increased insulation between the exterior of the building and the interior of the building. Although four glazing panels 130 are shown, it should be readily appreciated that fewer may be included, such as the first glazing panel 240 and the second glazing panel 260.

Though the integrated sash unit 200 is described with reference to four glazing panels (e.g., the first and third glazing panels 240, 242 associated with the first sash portion 220 and the second and fourth glazing panels 260, 262 associated with the second sash portion 230), the integrated sash unit 200 can include any number of glazing panels as desired. For example, the integrated sash unit 200 could include two glazing panels, three glazing panels, five glazing panels, and so forth.

Figure 3:
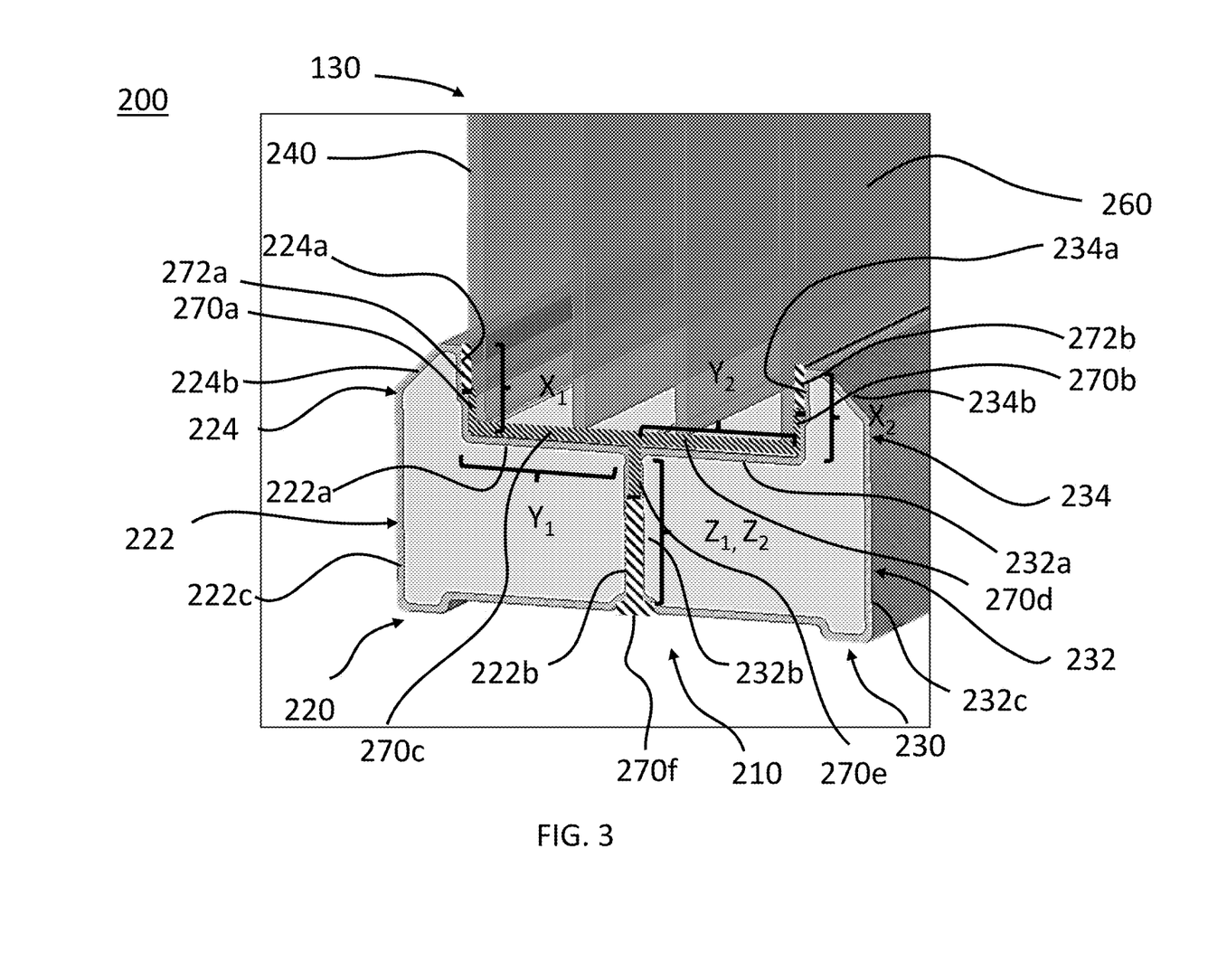
FIG. 3 is a perspective, sectional view of an integrated sash unit, in accordance with an embodiment.

FIG. 3 is a perspective view of an integrated sash unit 200, in accordance with an embodiment. In some instances, the first sash portion 220 includes a first body portion 222 and a first receiving wall 224. The first receiving wall 224 is generally a portion of the first sash portion 220 that extends generally upward (e.g., in the direction parallel to the extension of the glazing panels 130) from the first body portion 222. The first sash portion 220 may form a lip, shelf or other feature that helps maintain the glazing panels 130 in their desired position. As shown, the first receiving wall 224 includes a first inner wall surface 224a and a first peripheral wall surface 224b opposite the first inner wall surface 224a. In some examples, the first inner wall surface 224a may have a length $X_1$ from about 0.3 inches to about 1 inches. The first body portion 222 defines a first receiving surface 222a, a first coupling surface 222b, and a first peripheral surface 222c. As shown, the first receiving surface 222a is configured to receive or engage with the glazing panels 130. In some examples, the first receiving surface 222a may have a length $Y_1$ from about ⅛ inches to about 2 inches. The first coupling surface 222b is configured to engage with the second sash portion 230. The first coupling surface 222b is oriented generally perpendicular to the first receiving surface 222a and may have a length $Z_1$ from about ⅛ inches to about 2 inches. The first peripheral surface 222c is located opposite the first coupling surface 222b and the first receiving surface 222a to define the sash.

Like the first sash portion 220, the second sash portion 230 includes a second body portion 232 and a second receiving wall 234. The second receiving wall 234 is a portion of the second sash portion 230 that extends upward (e.g., in the direction of the glazing panels 130) from the second body portion 232. The second receiving wall 234 includes a second inner wall surface 234a and a second peripheral wall surface 234b opposite the second inner wall surface 234a. The second body portion 232 defines a second receiving surface 232a configured to receive or engage with the glazing panels 130, a second coupling surface 232b configured to engage with the first sash portion 220, and a second peripheral surface 232c located opposite the second coupling surface 232b and the second receiving surface 232a to define the sash. The second sash portion 230 can have the same or similar dimensions to the first sash portion 220. For example, the second inner wall surface 234a may have a length $X_2$, the second receiving surface 232a may have a length $Y_2$, and the second coupling surface 232b may have a length $Z_2$ as shown in FIG. 3.

As discussed herein, the first and second sash portions 220, 230 may be substantially symmetrical to one another or may be asymmetrical as desired. In some instances, the first and second sash portions 220, 230 are mirror images of one another, as shown in FIGS. 2 and 3. In some instances, the first and second sash portions 220, 230 may be formed of the same or similar materials. For example, as described herein, the first and second shells 220a, 230a of the first and second sash portions 220, 230 may both include fiberglass and the first and second inner cores 220b, 230b may each include a suitable type of foam, such as closed cell polyurethane foam having sufficient rigidity and compression strength for proper support of the fiberglass shell, as well as sufficient insulating value to achieve desirable thermal performance of the unit.

In some instances, the first and second sash portions 220, 230 may be formed of different materials. For example, the first and second inner cores 220b, 230b may include different types of foam and/or other insulating or structural materials. In still other examples, the first and second sash portions 220, 230 may be made of single structural material, such as fiberglass. Additionally, the first and/or second sash portions 220, 230 may also be free of a core material (e.g., substantially hollow) according to some examples. The first and second shells 220a, 230a can also include different materials. For example, the first shell 220a may be formed of a material suitable for the exterior of the building (e.g., the exterior side 114). For example, the material may have increased weather resistance, be designed for specific temperature ranges, or have a color compatible with the exterior of the respective building. The second shell 230a may be formed of a material suitable for the interior of the building (e.g., the interior side 112). In some instances, the first and second shells 220a, 230a may include different color schemes, patterns, textures, or other various characteristics specific to the exterior versus the interior of the building.

As shown in FIG. 3, the integrated sash unit 200 also includes the first glazing panel 240 supported by and coupled to the first inner wall surface 224a of the first receiving wall 224, where the first glazing panel 240 extends generally perpendicular to the first body portion 222. The integrated sash unit 200 also includes a second glazing panel 260 supported by and coupled to the second inner wall surface 234a of the second receiving wall 234. The second glazing panel 260 extends generally perpendicular to the second body portion 232 and spaced from the first glazing panel 240.

In some instances, the integrated sash unit 200 includes an overall vapor barrier sealant system for securing the various components together in a water, and water vapor tight arrangement. As generally shown, the integrated sash unit 200 includes:

a first vapor barrier sealant system 270a (e.g., a combined vapor barrier and sealant/adhesive material or discrete sealant/adhesive and vapor barrier material layers) arranged along a portion of or all of the length $X_1$ between the first glazing panel 240 and the first wall surface 224a of the first receiving wall 224;

a second vapor barrier sealant system 270b arranged between the first glazing panel 240 and the first sash portion 220 (e.g., a combined vapor barrier and sealant/adhesive material or discrete sealant/adhesive and vapor barrier material layers) arranged along a portion of or all of the length $X_2$ between the second glazing panel 260 and the second inner wall surface 234a of the second receiving walls 234;

a third vapor barrier sealant system 270c (e.g., a combined vapor barrier and sealant/adhesive material or discrete sealant/adhesive and vapor barrier material layers) arranged along a portion of or all of the length $Y_1$ between the first receiving surface 222a and one or more of the glazing panels 130;

a fourth vapor barrier sealant system 270d (e.g., a combined vapor barrier and adhesive sealant material or discrete sealant/adhesive and vapor barrier material layers) arranged along a portion of or all of the length $Y_2$ between the second receiving surface 232a and one or more of the glazing panels 130;

a fifth vapor barrier sealant system 270e (e.g., a combined vapor barrier and sealant/adhesive material or discrete sealant/adhesive and vapor barrier material layers) arranged along a portion of some or all of the length $Z_2$ between the first coupling surface 222b and the second coupling surface 232b;

a structural adhesive system 270f (e.g., a structural adhesive/sealant, a combined vapor barrier and sealant/adhesive material or discrete sealant/adhesive and vapor barrier material layers) may also be arranged toward the perimeter of the first coupling surface 222b and the second coupling surface 232b to provide structural support and/or additional sealing to the integrated sash unit 200; and first and second structural adhesive systems 272a, 272b (e.g., a sealant/adhesive material) arranged along an interior portion of some or all of the lengths X1, X2 interior to the first and second interior barrier sealant systems 270a, 270b. The first and second structural adhesive systems 272a, 272b may provide additional structural support and affixation of the glazing panels 240, 260 to the sash portions 220, 230.

Returning to FIG. 1, an optional set of corner vapor barrier sealant systems 270x is provide at each of the corners (e.g., to help seal and secure individual sash members together). The corner vapor barrier sealant systems 270x may comprise a combined vapor barrier and sealant/adhesive material or discrete sealant/adhesive and vapor barrier material layers. The corner vapor barrier sealant systems 270x may be applied, or otherwise employed to supply a final, secured and sealed assembly.

The various vapor barrier sealant systems help provide a moisture barrier between the glazing panels and the sash, for example, to prevent or substantially inhibit moisture from the surrounding atmosphere from diffusing through the first and second sash portions 220, 230 into the space between glazing panels 130 (FIG. 3). Those systems (whether provided as a combined material or separate barrier/sealant/adhesive components) also help secure the various components of the integrated sash unit 200 together. In terms of performance, the barrier sealant systems provide vapor barrier material (e.g., a film or coating) that extends along the lengths X1, X2, Y1, Y2, Z1, and Z2. The vapor barrier material is either coupled with a separate adhesive/sealant or is a combined adhesive/sealant/barrier along those lengths.

The vapor barrier sealant systems can include any variety of materials capable of providing a seal and a vapor barrier between the glazing panels 130 and the sash to help prevent moisture from entering the integrated sash unit 200. An example of a suitable vapor barrier material includes metalized laminate films, an example of a suitable sealant/adhesive material includes polyisobutylene, and an example of suitable combined vapor barrier/sealant/adhesive material includes that sold under the tradename "ISOMELT-R" reactive hot-melt by Kommerling.

In some instances, the first and second sash portions 220, 230 have a coefficient of thermal expansion approximately equal to a coefficient of thermal expansion of the glazing panels 130. For example, in instances where the glazing panels are made of glass, the sash portions 220, 230 may have a coefficient of thermal expansion from about 8 to about 10 microstrain*$K^{-1}$. In other instances, the sash portions 220, 230 may have a higher or lower coefficient of thermal expansion depending upon the material of the glazing panels 130. For example, the sash portions 220, 230 may have a coefficient of thermal expansion that is within 10×, 8×, 6×, 2×, 1× or any range or value between the recited ranges of the coefficient of thermal expansion of the glazing panels 130. In some preferred designs, the coefficient of thermal expansion of the sash portions 220, 230 is 2× or less than the coefficient of thermal expansion of the glazing panels 130 and more than about 0.5× the coefficient of thermal expansion of the glazing panels 130.

In some instances, the thermal conductivity of the integrated sash unit 200 is substantially the same as the thermal conductivity through the portion of the fenestration unit 100 corresponding to the glazing panels 130. In another example, the integrated sash unit 200 may have an R-value of approximately 10 ft$^2$·F·h/(BTU) (1.76 m$^2$·K/(W)).

Figure 4:
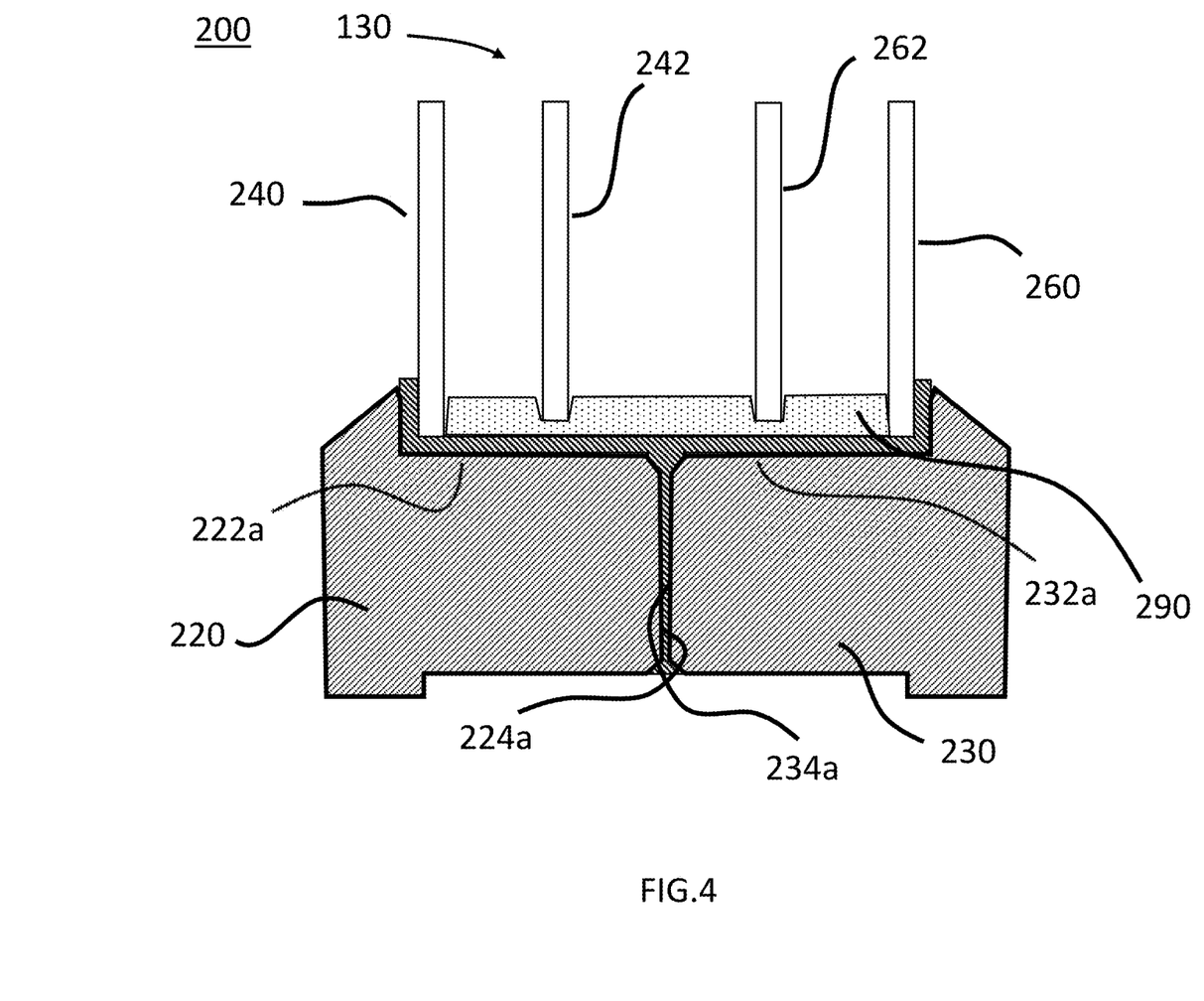
FIG. 4 is a cross-sectional view of an integrated sash unit including a spacing member, in accordance with an embodiment.

FIG. 4 is a cross-sectional view of the integrated sash unit 200 including a spacing member 290, in accordance with an embodiment. As shown, the spacing member 290 can be arranged between at least a portion of the glazing panels and the receiving surfaces 222a, 232a of the first and second sash portions 220, 230 to anchor the glazing panels in place. In some instances, the spacing member 290 can include grooves spaced a distance from one another. The glazing panels can be arranged within the grooves to separate the first glazing panel 240 from the third glazing panel 242 and the second glazing panel 260 from the fourth glazing panel 262, for example.

In some instances, the spacing member 290 can be a single, monolithic unit, while in other instances, the spacing member 290 may include more than one part (e.g., a first spacing portion associated with the first sash portion 220 and a second spacing portion associated with the second sash portion 230). The spacing member 290 is generally sufficiently stiff and rigid to support the glazing panels 130 in place. In some instances, the spacing member 290 can be relatively thick and have grooves for supporting the glazing panels 130. In other instances, the spacing member 290 may be a thin layer that has, for example, ridges capable of supporting the glazing panels 130.

The spacing member 290 may be coupled to the first and second sash portions 220, 230 (as well as the glazing panels 130 as desired) with a sealant, an adhesive, or a friction fit, for example. In some instances, a desiccant may be arranged with the spacing member 290, or separate from the spacing member 290, to help prevent moisture from accumulating in the spaces between glazing panels 130. For example, the desiccant may be in the form of a desiccant matrix, desiccant beads, or any other suitable desiccant known to those skilled in the art.

The various components of the integrated sash unit 200 are optionally secured to one another using the vapor barrier sealant systems previously described. The fenestration unit and/or integrated sash unit 200 described herein can be assembled in a variety of sequences and using a variety of tools. In some instances, the first glazing panel 240 is first attached to the first inner wall surface 224a of the first sash portion 220. The second glazing panel 260 is then attached to the second inner wall surface 234a of the second sash portion 230. The second sash portion 230 is then positioned adjacent to the first sash portion 220 so that the first and second glazing panels 240, 260 are spaced from one another. The first coupling surface 222b of the first sash portion 220 is then adhered to the second coupling surface 232b of the second sash portion 230.

The first and second coupling surfaces 224b, 234b can be adhered to one another with the barrier sealant systems previously described or using a separate sealant, adhesive, thermal bonding/welding, ultrasonic bonding/welding, or any of a variety of other fastening means as desired. As previously referenced, in some instances, the first and second coupling surfaces 224*b*, 234*b* are adhered with a bonding material such as an adhesive that has both structural adhesive properties and moisture/vapor barrier properties, or a moisture vapor barrier material such as polyisobutylene in combination with a separate structural adhesive material such as silicone or polyurethane.

The corners of each of the sash members 206 may be coupled at a miter cut with the optional set of corner vapor barrier sealant systems 270*x* provided at each of the corners and/or any of a variety of heat seals, adhesives, mechanical fasteners, corner inserts, or any of a variety of coupling mechanisms and sealants introduced at the surfaces, including between the corners between the sash members 206. Although miter cut corners, or miter joints are contemplated, any of a variety of corner attachments are contemplated including butt joints and others.

In some instances, the third glazing panel 242 is arranged with the first sash portion 220 and the fourth glazing panel 262 is arranged with the second sash portion 230 before the first and second sash portions 220, 230 are secured together. In some instances, the spacing member 290 is arranged on the first and second sash portions 220, 230 before the glazing panels 130 are installed. Each of the glazing panels 130 are then arranged on the spacing member 290 to separate the glazing panels 130 from one another, as described herein. Although various examples have been provided with four glazing panels 130 (e.g., two outer panels and two intermediate panels), it should be understood that any number of intermediate panels is contemplated (e.g., including zero) and may be implemented according to the principles described herein.

Once the integrated sash unit 200 is assembled, the integrated sash unit 200 is arranged within the frame 110 and coupled to at least a portion of the frame 110 with, for example, a sealant, an adhesive, or any other variety of coupling tools such as nails, screws, bolts, and fasteners. In various examples, the integrated sash unit 200 may be fixed within the frame 110 (e.g., the integrated sash unit 200 is stationary within the frame 110 and is not configured to slide), or the integrated sash unit 200 may be configured to swing, slide, or otherwise move relative to the frame 110 for venting purposes (e.g., as in the case of, for example, a double hung window or casement window).

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. An integrated sash unit, comprising
a plurality of vapor barrier sealant systems;
a first sash portion including an interior surface;
a second sash portion including an interior surface, wherein the second sash portion is coupled to the first sash portion by one or more of the vapor barrier sealant systems;
a plurality of glazing panels coupled to the first and second sash portions by one or more of the vapor barrier sealant systems along the interior surfaces of the first sash portion and the second sash portion, wherein each glazing panel contacts only one of the first sash portion and the second sash portion; and
sealant positioned along an interior surface of the first sash portion and an interior surface of the second sash portion, the sealant being substantially continuous along the interior surfaces of the first and second sash portions.

2. An integrated sash unit having and interior side and an exterior side, the integrated sash unit comprising:
a first sash portion forming a first body portion and a first receiving wall extending inwardly from the first body portion, the first receiving wall having a first inner wall surface and a first peripheral wall surface opposing the first inner wall surface and being positioned on the exterior side of the integrated sash unit, and the first body portion defining a first receiving surface and a first coupling surface and a first body peripheral surface opposite the first receiving surface and the first coupling surface;
a second sash portion forming a second body portion and a second receiving wall extending inwardly from the second body portion, the second receiving wall having a second inner wall surface and a second peripheral wall surface opposite the second inner wall surface and positioned on the interior side of the integrated sash unit, and the second body portion defining a second receiving surface and a second coupling surface and a second body peripheral surface,
the first coupling surface of the first sash portion being coupled to the second coupling surface of the second sash portion;
a plurality of glazing panels including,
a first glazing panel supported by and coupled to the first inner wall surface of the first sash portion without being coupled to the second sash portion; and
a second glazing panel supported by and coupled to the second inner wall surface of the second sash portion without being coupled to the first sash portion; and
a spacer operable to receive at least one of the plurality of glazing panels and positioned between the receiving surfaces of the first and second sash portion and the at least one of the plurality of glazing portion, wherein the spacer is formed of a rigid material.

3. The integrated sash unit of claim 2, wherein the first and second sash portions are pultruded portions.

4. The integrated sash unit of claim 2, wherein the first sash portion includes a first shell and the second sash portion includes a second shell, each of the first and second shells being formed of fiberglass material.

5. The integrated sash unit of claim 2, wherein the first and second sash portions are formed of a different material set than one another.

6. The integrated sash unit of claim 2, wherein the first sash portion includes a first shell surrounding a first inner core.

7. The integrated sash unit of claim 2, wherein the plurality of glazing panels further comprises a third glazing panel arranged with the first sash portion and spaced a distance from the first glazing panel and a fourth glazing panel arranged with the second sash portion and spaced a distance from the second glazing panel.

8. The integrated sash unit of claim 2, further comprising a spacing member, the spacing member separating the plurality of glazing panels.

9. The integrated sash unit of claim 2, wherein a vapor barrier material is arranged between the first glazing panel and the first sash portion and between the second glazing panel and the second sash portion.

10. The integrated sash unit of claim 2, wherein a coefficient of thermal expansion of the first and second sash portions is approximately equal to a coefficient of thermal expansion of the plurality of glazing panels.

11. The integrated sash unit of claim 2, wherein the plurality of glazing panels are spaced from one another to define one or more insulating spaces.

12. A fenestration unit assembly, comprising a frame supporting the integrated sash unit of any preceding claim.

13. The assembly of claim 12, wherein the first and second sash portions are attached to the frame with a sealant.

14. The assembly of claim 12, wherein the fenestration unit assembly has an R-value of approximately 10.

15. A method of assembling an integrated sash unit, the method comprising:
   attaching a first glazing panel to a first inner wall surface of a first sash portion;
   attaching a second glazing panel to a second inner wall surface of a second sash portion;
   attaching a third glazing panel to the first inner wall surface of the first sash portion;
   attaching a fourth glazing panel to the second inner wall surface of the second sash portion;
   providing a sealant along the first inner wall surface of the first sash portion and second infer wall surface of the second sash portion such that the sealant is substantially continuous along the first and second inner wall surfaces of the first and second sash portion;
   positioning the second sash portion adjacent the first sash portion such that the first glazing panel and the second glazing panel are spaced from one another; and
   adhering a first coupling surface of the first sash portion to a second coupling surface of the second sash portion, wherein the first glazing panel is not in contact with the second sash portion and the second glazing panel is not in contact with the first sash portion.

16. The method of claim 15, further comprising arranging the third glazing panel with the first sash portion and arranging the fourth glazing panel with the second sash portion before adhering the first sash portion to the second sash portion.

17. The method of claim 16, further comprising arranging a spacing member with the first and second sash portions, and arranging each of the glazing panels on the spacing member to separate the glazing panels from one another.

18. The integrated sash unit of claim 2, wherein each of the plurality of glazing panels contacts only one of the first sash portion and the second sash portion.

19. The integrated sash unit of claim 2, further comprising a vapor barrier forming a planar surface operable to receive the plurality of glazing panels.

20. The integrated sash unit of claim 2, further comprising a vapor barrier positioned along the first receiving surface of the first sash portion and the second receiving surface of the second sash portion.

21. The integrated sash unit of claim 2, wherein the first and the second receiving surfaces are positioned adjacent each other.

22. The integrated sash unit of claim 1, further comprising an adhesive operable to adhere the first sash portion to the second sash portion.

23. The integrated sash unit of claim 2, wherein the spacer is monolithic.

24. The integrated sash unit of claim 2, wherein the spacer defines a plurality of grooves operable to receive panels of the plurality of glazing panels.

25. The method of claim 15, further comprising filling a space between the first and third glazing panels with gas and a space between the second and fourth glazing panels with gas.

* * * * *